(12) United States Patent
Patel

(10) Patent No.: US 7,182,806 B2
(45) Date of Patent: *Feb. 27, 2007

(54) PHTHALOCYANINES AND THEIR USE IN INK-JET PRINTERS

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/564,935

(22) PCT Filed: Jul. 2, 2004

(86) PCT No.: PCT/GB2004/002855

§ 371 (c)(1),
(2), (4) Date: Jan. 18, 2006

(87) PCT Pub. No.: WO2005/014725

PCT Pub. Date: Feb. 17, 2005

(65) Prior Publication Data

US 2006/0201387 A1    Sep. 14, 2006

(30) Foreign Application Priority Data

Jul. 18, 2003  (GB) ................... 0316854.9
Jul. 25, 2003  (GB) ................... 0317413.3

(51) Int. Cl.
*C09D 11/00* (2006.01)
*C09B 47/04* (2006.01)

(52) U.S. Cl. ..................... 106/31.49; 8/638; 8/661
(58) Field of Classification Search ........... 106/31.49; 8/638, 661; 347/100
See application file for complete search history.

(56) References Cited

U.S. PATENT DOCUMENTS

| 2,285,359 A | 6/1942 | Rösch et al. ......... 260/214 |
| 2,300,572 A | 11/1942 | Hoyer et al. ......... 260/214 |
| 2,414,374 A | 1/1947 | Haddock et al. ...... 260/314.5 |
| 3,365,463 A | 1/1968 | Groll et al. ......... 260/314.5 |
| 3,622,263 A | 11/1971 | Groll et al. ............ 8/178 |
| 3,679,675 A | 7/1972 | von Tobel ............ 260/242 |
| 3,711,508 A * | 1/1973 | Groll ................. 540/132 |
| 4,791,165 A | 12/1988 | Bearss et al. ......... 524/516 |

(Continued)

FOREIGN PATENT DOCUMENTS

BE    536200    9/1955

(Continued)

OTHER PUBLICATIONS

Schofield et al., "Analysis of sulphonated phthalocyanine dyes by capillary electrophoresis", Journal of Chromatography, 770:345-348 (1997), no month.

(Continued)

*Primary Examiner*—Helene Klemanski
(74) *Attorney, Agent, or Firm*—Morgan Lewis & Bockius LLP

(57) ABSTRACT

A composition comprising:
(a) a major dye component which is a mixture of phthalocyanine dyes of Formula (1) and salts thereof:

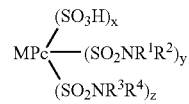

Formula (1)

wherein:
M is Cu or Ni;
Pc represents a phthalocyanine nucleus of formula;

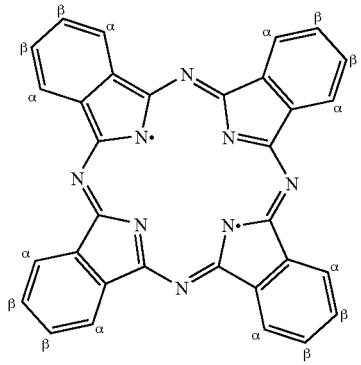

$R^1$ and $R^2$ independently are H or optionally substituted $C_{1-4}$alkyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted aliphatic or aromatic ring system;
x is 0.1 to 3.8;
y is 0.1 to 3.8;
z is 0.1 to 3.8;
the sum of (x+y+z) is 4; and
the substituents, represented by x, y and z, are attached only to a β-position on the phthalocyanine ring; and
(b) a liquid medium which comprises water and an organic solvent or an organic solvent free from water.

Also novel dyes, ink-jet printing processes, printed images, and cartridges.

39 Claims, No Drawings

U.S. PATENT DOCUMENTS

| | | | |
|---|---|---|---|
| 5,098,474 | A | 3/1992 | Pawlowski et al. ............ 106/22 |
| 5,183,501 | A | 2/1993 | Kawashita et al. ....... 106/22 D |
| 5,382,283 | A | 1/1995 | Yui et al. .................. 106/22 R |
| 5,709,717 | A * | 1/1998 | Reddig et al. ................. 8/549 |
| 5,739,319 | A | 4/1998 | Yamasaki .................. 540/140 |
| 5,879,439 | A | 3/1999 | Nagai et al. ............. 106/31.28 |
| 5,993,524 | A | 11/1999 | Nagai et al. ............. 106/31.27 |
| 6,149,722 | A * | 11/2000 | Robertson et al. ....... 106/31.49 |
| 6,190,422 | B1 * | 2/2001 | Carr ............................. 8/445 |
| 6,362,348 | B1 | 3/2002 | Takahashi et al. .......... 549/315 |
| 6,379,441 | B1 | 4/2002 | Kanaya et al. ........... 106/31.27 |
| 6,444,807 | B1 | 9/2002 | Wolleb et al. .............. 540/131 |
| 6,517,621 | B2 * | 2/2003 | Andrievsky et al. ..... 106/31.49 |
| 6,569,212 | B2 * | 5/2003 | Carr ............................. 8/445 |
| 6,607,589 | B2 * | 8/2003 | Adamic et al. .......... 106/31.49 |
| 7,014,696 | B2 * | 3/2006 | Patel ...................... 106/31.49 |
| 7,022,171 | B2 * | 4/2006 | Patel et al. .............. 106/31.49 |
| 2001/0011396 | A1 | 8/2001 | Carr ............................. 8/445 |
| 2003/0000421 | A1* | 1/2003 | Andrievsky et al. ..... 106/31.49 |
| 2003/0217671 | A1 | 11/2003 | Ozawa ................... 106/31.49 |
| 2004/0045478 | A1 | 3/2004 | Tateishi et al. .......... 106/31.49 |
| 2004/0099181 | A1 | 5/2004 | Tateishi et al. .......... 106/31.47 |
| 2005/0073563 | A1 | 4/2005 | Hanaki et al. .............. 347/100 |
| 2005/0076807 | A1 | 4/2005 | Ogawa et al. ........... 106/31.49 |
| 2005/0081745 | A1 | 4/2005 | Ogawa et al. ........... 106/31.27 |
| 2005/0215773 | A1 | 9/2005 | Tateishi et al. ............. 534/653 |
| 2006/0057309 | A1* | 3/2006 | Patel ........................ 428/32.1 |
| 2006/0156951 | A1* | 7/2006 | Patel ...................... 106/31.49 |
| 2006/0162615 | A1* | 7/2006 | Patel ...................... 106/31.49 |
| 2006/0201384 | A1* | 9/2006 | Patel ...................... 106/31.46 |
| 2006/0201385 | A1* | 9/2006 | Patel ...................... 106/31.46 |

FOREIGN PATENT DOCUMENTS

| | | |
|---|---|---|
| EP | 1 239 010 A1 | 9/2002 |
| EP | 1 473 335 A1 | 11/2004 |
| EP | 1 607 445 A1 | 12/2005 |
| EP | 1 609 824 A1 | 12/2005 |
| GB | 496663 | 12/1938 |
| GB | 704231 | 2/1954 |
| GB | 784843 | 10/1957 |
| GB | 921250 | 3/1963 |
| GB | 937182 | 9/1963 |
| GB | 1039379 | 8/1966 |
| GB | 2 341 868 A | 3/2000 |
| JP | 2003-080072 | 3/2003 |
| JP | 2003-090485 | 3/2003 |
| JP | 2003-095292 | 3/2003 |
| JP | 2003289492 | 8/2003 |
| WO | WO 98/49239 | 11/1998 |
| WO | WO 01/66647 A1 | 9/2001 |
| WO | WO 01/66648 A1 | 9/2001 |
| WO | WO 03/068866 A1 | 1/2003 |
| WO | WO 03/089532 A1 | 10/2003 |
| WO | WO 2004/035700 A1 | 4/2004 |
| WO | WO 2004/035701 A1 | 4/2004 |

OTHER PUBLICATIONS

Color Index, p. 4619, No. 74220, C.I. Acid Blue 249, no date available.

* cited by examiner

PHTHALOCYANINES AND THEIR USE IN INK-JET PRINTERS

This invention relates to compositions, to dyes, to printing processes, to printed substrates and to ink-jet printer cartridges.

Ink-jet printing is a non-impact printing technique in which droplets of ink are ejected through a fine nozzle onto a substrate without bringing the nozzle into contact with the substrate.

Colour ink-jet printers typically use four inks of differing hues: magenta, yellow, cyan, and black. Colours other than these may be obtained using differing combinations of these inks. Thus, for optimum print quality, the colourants used must be able to form an ink with a specific precise hue. This can be achieved by mixing colourants but is advantageously achieved by used a single colourant with the exact hue required.

With the advent of high-resolution digital cameras and ink-jet printers it is becoming increasingly common to print off photographs using an ink-jet printer. This avoids the expense of conventional silver halide photography and provides a print quickly and conveniently.

While ink-jet printers have many advantages over other forms of printing and image development there are still technical challenges to be addressed. For example, there are the contradictory requirements of providing ink colorants that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer. Furthermore, the resultant images desirably do not fade rapidly on exposure to light or common oxidising gases such as ozone.

Most cyan colorants used in ink-jet printing are based on phthalocyanines and problems of fading and shade change are particularly acute with dyes of this class.

Thus, the present invention provides a composition comprising:

(a) a major dye component which is a mixture of phthalocyanine dyes of Formula (1) and salts thereof:

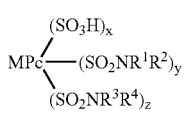

Formula (1)

wherein:

M is Cu or Ni;

Pc represents a phthalocyanine nucleus of formula;

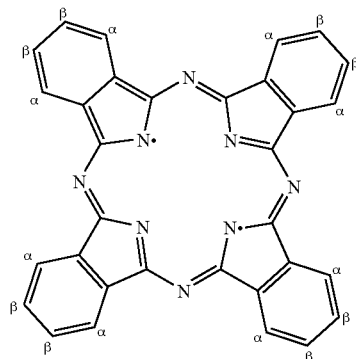

$R^1$ and $R^2$ independently are H or optionally substituted $C_{1-4}$alkyl;

$R^3$ is H or optionally substituted hydrocarbyl; and $R^4$ is optionally substituted hydrocarbyl; or $R^3$ and $R^4$ together with the nitrogen atom to which they are attached represent an optionally substituted aliphatic or aromatic ring system;

x is 0.1 to 3.8;

y is 0.1 to 3.8;

z is 0.1 to 3.8;

the sum of x+y+z is 4; and the substituents, represented by x, y and z, are attached only to a Eposition on the phthalocyanine ring; and (b) a liquid medium which comprises water and an organic solvent or an organic solvent free from water.

Phthalocyanine dyes bearing sulfo, sulfonamide and substituted sulfonamide substituents are usually prepared by sulfonating a phthalocyanine pigment followed by chlorination and then amination/amidation. The product of this reaction is a complex mixture which carries sulfo, sulfonamide and substituted sulfonamide substituents in any susceptible position on the phthalocyanine ring (for example see Schofield, J and Asaf, M in Journal of Chromatography, 1997, 770, pp345–348).

The phthalocyanine dyes of Formula (1) where the sulfo and sulfonamide substituents are attached to a β position on the phthalocyanine ring may be prepared by any method known in the art, and particularly by cyclisation of appropriate β-sulfo substituted phthalic acid, phthalonitrile, iminoisoindoline, phthalic anhydride, phthalimide or phthalamide in the presence of a suitable nitrogen source (if required), a copper or nickel salt, such as $CuCl_2$, and a base such as 1,8-diazabicyclo[5.4.0]undec-7-ene (DBU) followed by chlorination and then amination/amidation.

Preferably phthalocyanine dyes of Formula (1) where the sulfo, sulfonamide and substituted sulfonamide substituents are attached to a β-position on the phthalocyanine ring are prepared by cyclisation of 4-sulfo-phthalic acid in the presence of a nitrogen source, such as urea, a copper or nickel salt, such as $CuCl_2$, and a base such as 1,8-diazabicyclo[5.4.0]undec-7-ene (DBU) to give phthalocyanine β-tetrasulfonic acid. The phthalocyanine β-tetrasulfonic acid is then chlorinated and the sulfonyl chloride groups so formed are reacted with compounds of formula $HNR^1R^2$ and $HNR^3R^4$ wherein $R^1$, $R^2$, $R^3$ and $R^4$ are as hereinbefore defined. This reaction is preferably performed in water at a pH above 7. Typically the reaction is performed at a temperature of 30 to 70° C. and is usually complete in less than 24 hours. The compounds of formula $HNR^1R^2$ and $HNR^3R^4$ may be used as a mixture or added sequentially.

Many of the compounds of formula $HNR^1R^2$ and $HNR^3R^4$ are commercially available, for example ammonia and metanilic acid, others may be made easily by a skilled person using methods which are well known in the art.

The ratio of sulfo to sulfonamide substituents may be varied by varying the nature and amount of chlorinating agent used, the relative amounts of compounds of formula $HNR^1R^2$ and $HNR^3R^4$ used and the reaction conditions in both reactions.

A skilled person will appreciate that the product of these reactions will be a disperse mixture and so the values of x, y and z will represent an average of the groups present in the mixture.

When phthalocyanine tetrasulfonic acid is an intermediate in a route to dyes of Formula (1) it may be chlorinated by reacting with any suitable chlorinating agent.

Chlorination is preferably carried out by treating the phthalocyanine tetrasulfonic acid with chlorosulfonic acid preferably in the presence of an acid halide such as thionyl chloride, sulfuryl chloride, phosphorous pentachloride, phosphorous oxychloride and phosphorous trichloride.

M is preferably Cu.

In a first preferred embodiment $R^1$, $R^2$ and $R^3$ preferably are independently H or methyl, more preferably $R^1$, $R^2$ and $R^3$ are all H, and $R^4$ is optionally substituted aryl, especially optionally substituted phenyl or naphthyl. More preferably $R^4$ is optionally substituted phenyl, especially phenyl bearing at least one sulfo, carboxy or phosphato substituent and having further optional substituents. It is especially preferred that $R^4$ is phenyl bearing a single sulfo, carboxy or phosphato substituent, particularly phenyl bearing a single sulfo substituent.

In a second preferred embodiment $R^1$ and $R^2$ independently are H or methyl, more preferably $R^1$ and $R^2$ are both H, and $R^3$ and $R^4$ together with the nitrogen atom to which they are attached represent an optionally substituted mono, bi or tricyclic aliphatic or aromatic ring. More preferably $R^3$ and $R^4$ together with the nitrogen atom to which they are attached represent an optionally substituted 3 to 8 membered aliphatic or aromatic ring. It is especially preferred that $R^3$ and $R^4$ together with the nitrogen atom to which they are attached represent an optionally substituted 5- or 6-membered aliphatic or aromatic ring. The optionally substituted aromatic or aliphatic ring formed by $R^3$ and $R^4$ together with the nitrogen atom to which they are attached may comprise at least one further hetero atom. Examples of preferred ring systems include imidazole, pyrazole, pyrrole, benzimidazole, indole, tetrahydro(iso)quinoline, decahydro(iso)quinoline, pyrrolidine, pyrroline, imidazolidine, imidazoline, pyrazolidine, pyrazoline, piperidine, piperazine, indoline, isoindoline, thiazolidine and morpholine.

In a third preferred embodiment $R^1$ and $R^2$ independently are H or methyl, more preferably $R^1$ and $R^2$ are both H; $R^3$ is H or optionally substituted alkyl, preferably optionally substituted $C_{1-8}$alkyl, more preferably optionally substituted $C_{1-4}$alkyl and $R^4$ is optionally substituted alkyl, preferably optionally substituted $C_{1-8}$alkyl more preferably optionally substituted $C_{1-4}$alkyl.

It is particularly preferred that in the third preferred embodiment $R^1$ and $R^2$ are H, $R^3$ is H or $C_{1-4}$alkyl bearing at least one acid substituent selected from the group consisting of —$SO_3H$, —COOH or —$PO_3H_2$ and $R^4$ is $C_{1-4}$alkyl bearing at least one acid substituent selected from the group consisting of —$SO_3H$, —COOH or —$PO_3H_2$.

Preferred optional substituents which may be present on $R^1$, $R^2$ and $R^3$ (in the first preferred embodiment) and on $R^1$, $R^2$, $R^3$ and $R^4$ (in the third preferred embodiment) are independently selected from: optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphato, sulfo, nitro, cyano, halo, ureido, —$SO_2F$, hydroxy, ester, —$COR^a$, —$CONR^aR^b$, carboxyester, sulfone, and —$SO_2NR^aR^b$, wherein $R^a$ and $R^b$ are each independently H or optionally substituted alkyl (especially $C_{1-4}$-alkyl). Optional substituents for $R^a$ and $R^b$ may be selected from the substituents described for $R^1$, $R^2$ and $R^3$.

Preferred optional substituents which may be present on $R^4$ in the first preferred embodiment or on the ring formed by $R^3$ and $R^4$ together with the nitrogen atom to which they are attached in the second preferred embodiment are independently selected from: optionally substituted alkyl (preferably $C_{1-4}$-alkyl), optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphato, sulfo, nitro, cyano, halo, ureido, —$SO_2F$, hydroxy, ester, —$NR^aR^b$, —$COR^a$, —$CONR^aR^b$, —$NHCOR^a$, carboxyester, sulfone, and —$SO_2NR^aR^b$, wherein $R^a$ and $R^b$ are each independently H or optionally substituted alkyl (especially $C_{1-4}$-alkyl). Optional substituents for $R^a$ and $R^b$ may be selected from the substituents described for $R^4$.

Preferably x has a value of 0.5 to 3.5.
Preferably y has a value of 0.5 to 3.5.
Preferably z has a value of 0.5 to 3.5.

It is particularly preferred that in dyes of Formula (1) that x has a value of 0.5 to 3.5, y has a value of 0.5 to 3.5 and z has a value of 0.5 to 3.5.

A preferred mixture of dyes of Formula (1) in the first embodiment are of Formula (2) and salts thereof:

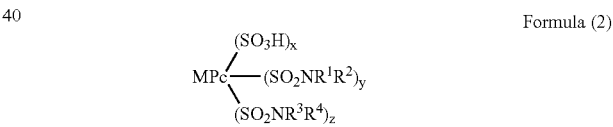

Formula (2)

wherein:

M is Cu;

Pc represents a phthalocyanine nucleus of formula;

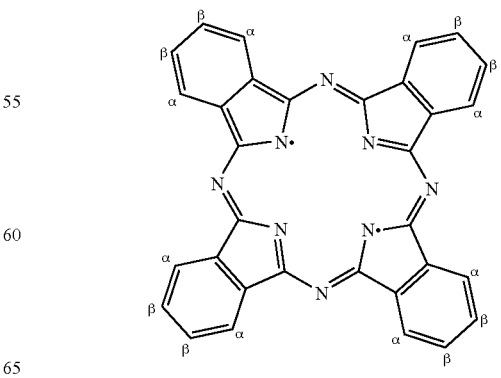

$R^1$, $R^2$ and $R^3$ independently are H or methyl;

$R^4$ is phenyl bearing at least one sulfo, carboxy or phosphato substituent and having further optional substituents other than amino or substituted amino;

x is 0.5 to 3.5;
y is 0.5 to 3.5;
z is 0.5 to 3.5;

the sum of (x+y+z) is 4; and the substituents, represented by x, y and z, are attached only to a β-position on the phthalocyanine ring.

Further optional substituents that may be present on $R^4$ in dyes of Formula (2) be independently selected from the list given above for $R^4$ in dyes of Formula (1).

A preferred mixture of dyes of Formula (1) in the third embodiment are of Formula (3) and salts thereof:

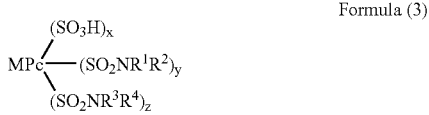

Formula (3)

wherein:
M is Cu;
Pc represents a phthalocyanine nucleus of formula;

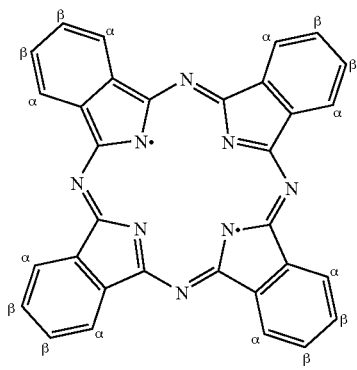

$R^1$ and $R^2$ independently are H or methyl;

$R^3$ is H, methyl or $C_{1-4}$alkyl bearing at least one acid substituent, selected from the group consisting of —$SO_3H$, —COOH or —$PO_3H_2$ $R^4$ independently are $C_{1-4}$alkyl bearing at least one acid substituent, selected from the group consisting of —$SO_3H$, —COOH or —$PO_3H_2$;

x is 0.5 to 3.5;
y is 0.5 to 3.5;
z is 0.5 to 3.5;

the sum of (x+y+z) is 4; and the substituents, represented by x, y and z, are attached only to a β-position on the phthalocyanine ring.

In the dyes of Formula (1) the α-positions of the phthalocyanine ring are preferably unsubstituted, that is they carry a hydrogen subsbtuent.

The dyes of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the dyes of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethylsulfonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dlcyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid or basic groups on the dyes of Formula (1), particularly acid groups, are preferably in the form of a salt. Thus, the Formulae shown herein include the dyes in free acid and in salt form.

Preferred salts are alkali metal salts, especially lithium, sodium and potassium, ammonium and substituted ammonium salts (including quaternary amines such as (($CH_3)_4N^+$) and mixtures thereof. Especially preferred are salts with sodium, lithium, ammonia and volatile amines, more especially sodium salts. The dyes may be converted into a salt using known techniques.

The dyes of Formula (1) may exist in tautomeric forms other than those shown in this specification. These tautomers are included within the scope of the present invention.

When the preferred route, as set out above, is used to synthesise dyes of Formula (1) then they are predominantly formed as ammonium salts. However, any known techniques may be used to exchange ammonia for another cation for example, acidification, optionally followed by dialysis, to remove the original cations with subsequent addition of alternative cations (e.g. by addition of alkali metal hydroxide, ammonium salt or amine). Use of ion exchange resins and reverse osmosis are other well-known techniques for cation exchange.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxy-ethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$-alkyl ethers of diols, more preferably mono- $C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP-A-425,150.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols.

In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the liquid medium is an organic solvent free from water it is a mixture of 2 to 5 different organic solvents. This allows a liquid medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid medium may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; C.I. Add Yellow 23; and any of the dyes used in ink-jet printers sold by Seiko Epson Corporation, Hewlett Packard Company, Canon Inc. & Lexmark International.

If the composition of the present invention contains phthalocyanine dyes other than those of Formula (1) then preferably at least 70% by weight, more preferably at least 80% by weight, especially at least 90% by weight, more especially at least 95% by weight and particularly at least 99% by weight of the total amount of phthalocyanine dye is of Formula (1) wherein the substituents, represented by x, y and z are attached to a 0 position on the phthalocyanine ring.

It is preferred that the composition according to the invention is an ink suitable for use in an ink-jet printer. Ink suitable for use in an ink-jet printer is an ink which is able to repeatedly fire through an ink-jet printing head without causing blockage of the fine nozzles.

An ink suitable for use in an ink-jet printer preferably has a viscosity of less than 20 cP, more preferably less than 10 cP, especially less than 5 cP, at 25° C.

The surface tension of the ink is preferably in the range 20–65 dynes/cm, more preferably in the range 30–60 dynes/cm.

An ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other component of the ink).

Preferably an ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably an ink suitable for use in an ink-jet printer contains less than 500 ppm, more preferably less than 250 ppm, especially less than 100 ppm, more especially less than 10 ppm in total of halide, particularly chloride, ions.

Preferred compositions comprise:
  (a) from 0.01 to 30 parts of dyes of Formula (1); and
  (b) from 70 to 99.99 parts of a liquid medium;

wherein all parts are by weight.

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus, the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

A second aspect of the present invention provides a mixture of dyes of Formula (4) and salts thereof:

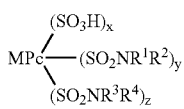

Formula (4)

wherein:

M is Cu or Ni;

Pc represents a phthalocyanine nucleus of formula;

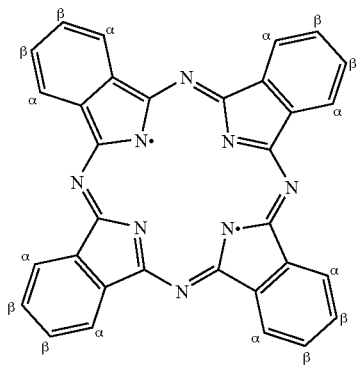

$R^1$ and $R^2$ independently are H or optionally substituted $C_{1-4}$alkyl;

$R^3$ is H or optionally substituted $C_{1-8}$alkyl;

$R^4$ is optionally substituted $C_{1-8}$alkyl or phenyl bearing at least one sulfo, carboxy or phosphato substituent and having further optional substituents other than amino or substituted amino; or $R^3$ and $R^4$ together with the nitrogen atom to which they are attached represent an optionally substituted 5- or 6-membered aliphatic or aromatic ring;

x is 0.1 to 3.8;

y is 0.1 to 3.8;

z is 0.1 to 3.8;

the sum of (x+y+z) is 4; and the substituents, represented by x, y and z, are attached only to a β-position on the phthalocyanine ring.

In the dyes of Formula (4) the α-positions on the phthalocyanine ring are unsubstituted, that is they bear a H.

M, $R^1$, $R^2$, $R^3$, $R^4$, x, y and z are all as described and preferred for dyes of Formula (1) in the in the first aspect of the invention.

Preferred mixtures of dyes of Formula (4) are of Formula (2) or Formula (3) and salts thereof as defined and preferred in the first aspect of the invention.

Also preferred are mixtures of dyes as described in the second preferred embodiment in the first aspect of the invention wherein $R^1$ and $R^2$ independently are H or methyl, more preferably $R^1$ and $R^2$ are both H, and $R^3$ and $R^4$ together with the nitrogen atom to which they are attached represent an optionally substituted mono, bi or tricyclic aliphatic or aromatic ring. More preferably $R^3$ and $R^4$ together with the nitrogen atom to which they are attached represent an optionally substituted 3 to 8 membered aliphatic or aromatic ring. It is especially preferred that $R^3$ and $R^4$ together with the nitrogen atom to which they are attached represent an optionally substituted 5- or 6-membered aliphatic or aromatic ring.

Preferably $R^4$ in Formula (2) is phenyl bearing a single sulfo substituent.

It is especially preferred that in dyes of Formula (2) $R^1$, $R^2$ and $R^3$ are all H and $R^4$ is a single sulfo substituent meta to the bridging sulfonamide.

Further optional substituents for $R^4$ may be selected from the list of substituents preferred for $R^4$ above.

Preferably mixtures of dyes of Formula (4) are free from fibre reactive groups wherein fibre reactive groups are as described in the first aspect of the invention.

The dyes of Formula (4) have attractive, strong cyan shades and are valuable colorants for use in the preparation of ink-jet printing inks. They benefit from a good balance of solubility, storage stability and fastness to water and light and especially ozone.

A third aspect of the invention provides a composition which comprises a major dye component which is a mixture of phthalocyanine dyes of Formula (4) as defined in the second aspect of the invention and water.

It is preferred that the composition according to the third aspect of the invention is an ink suitable for use in an ink-jet printer. Such inks are as described in the first aspect of the invention.

The ink according to the third aspect of the invention may contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink of the third aspect of the invention to modify the shade and performance properties. Examples of such colorants include C.I. Direct Yellow 86, 132, 142 and 173; C.I. Direct Blue 307; C.I. Food Black 2; C.I. Direct Black 168 and 195; C.I. Add Yellow 23; and any of the dyes used In ink-jet printers sold by Seiko Epson Corporation, Hewlett Packard Company, Canon Inc. & Lexmark International.

If the composition of the third aspect of the present invention contains phthalocyanine dyes other than those of Formula (4) then preferably at least 70% by weight, more preferably at least 80% by weight, especially at least 90% by weight, more especially at least 95% by weight and particularly least 99% by weight of the total amount of phthalocyanine dye is of Formula (4) wherein the substituents, represented by x, y and z are attached to a β position on the phthalocyanine ring.

A fourth aspect of the invention provides a process for forming an image on a substrate comprising applying an ink suitable for use in a ink-jet printer, as described in the first or third aspects of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred.

A fifth aspect of the present invention provides a material preferably paper, plastic, a textile, metal or glass, more preferably paper, an overhead projector slide or a textile material, especially paper more especially plain, coated or treated papers printed with a composition according to the first or third aspects of the invention, with a dye according to the third aspect of the invention or by means of a process according to the fourth aspect of the invention.

It is especially preferred that the printed material of the fifth aspect of the invention is a photograph printed by a process according to the fourth aspect of the invention.

A sixth aspect of the present invention provides an ink-jet printer cartridge comprising a chamber and an ink wherein the ink is in the chamber and the ink is an ink suitable for use in an ink-jet printer, as defined in the first or third aspects of the present invention. The cartridge may contain a high concentration ink and a low concentration ink, as described in the first aspect of the invention, in different chambers.

The invention is further illustrated by the following Examples in which all parts and percentages are by weight unless otherwise stated.

EXAMPLE 1

Preparation of the Following Dye Substituted only in the β-position wherein x is 1.1. and (y+z) is 2.2:

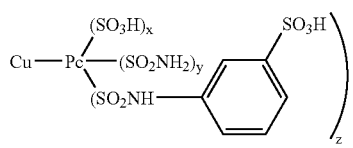

Analysis of Dyes of Formula (1)

Confirmation of the structure of dyes of Formula (1) is by mass spec. Elemental analysis is used to determine the ratios of x to y+z. Thus, when the sum of x plus y and z is not exactly 4 this is thought to be due to the presence of impurities. The presence of these impurities and their effect on the estimated values of x, y and z would be well known to a person skilled in the art who would appreciate that the value of x plus y plus z should not exceed 4 and who would treat the experimentally determined values of x, y and z as indicative of the true ratios of the groups. Also with some dyes according to the present invention it is not possible, using these methods, to discriminate between the different sulfonamide substituents. In these cases x and y are either quoted as a sum of both sulfonamide groups i.e. (y+z) or are quoted as half the total sulfonamide detected i.e. y=1.4av, in this latter case y and z will always be given as the same value.

Stage 1—Preparation of Copper Phthalocyanine Substituted with 4-SO$_3$H groups in the β-position The following components; potassium 4-sulfo-phthalic acid (56.8 g), urea (120 g), CuCl$_2$ (6.9 g), ammonium molybdate (1.2 g) and 1,8-diazabicyclo[5.4.0]undec-7-ene (DBU) (7.5 g) were mixed in a reaction vessel.

The mixture was then warmed in stages (130° C./30 minutes, 150° C./30 minutes, 180° C./30 minutes, 220° C.) over 2 hours and the melt which formed was stirred at 220° C. for a further 2 hours.

The solid which formed was extracted 4 times with hot water (4×200 ml) and the extract was filtered to remove insoluble material.

The resultant filtrate was stirred at between 60° C.–70° C. and then sufficient sodium chloride was added to give 7% brine solution. Stirring was continued and the solid which precipitated was filtered, washed with a 10% brine solution (200 ml) and pulled dry by vacuum. The resultant damp solid (77.6 g) was slurried in acetone, filtered and dried first at room temperature and then at 50° C. Analysis revealed 3.8 sulfo groups per phthalocyanine.

Stage 2 Chlorosufonation of Copper Ohthalocyanine Substituted with 4-SO3H groups in the β-position Phosphorous oxychloride (6.99 g) was added to chlorosulfonic acid (69.9 g) at 28° C. The sulfonated phthalocyanine product of stage 1 (11.8 g) was then added to this mixture over 10–15 minutes while keeping temperature below 60° C. This reaction mixture was stirred at 50° C. for 15–20 minutes and then slowly warned to 120° C.–125° C. and kept at this temperature, with stirring for 3 hours. At the end of this time the reaction mixture was cooled and stirred at room temperature overnight.

The next day the reaction-melt was drowned onto a mixture of water/ice/salt/HCl (50 ml/150 g/10 g/2.5 ml), keeping the temperature below 0° C. using external cooling and further addition of ice as necessary. The resultant suspension was stirred at 0° C. for 30 minutes and then filtered, washed with acidified solution of ice cold 10% brine solution (100 ml) and pulled dry by vacuum to give the product as a damp paste.

Stage 3 Preparation of the Title Product

Damp paste prepared as in stage 2 (33 g) was added in portions over 10–15 minutes at 0°–5° C. to a stirred solution of metanilic acid (4.15 g), concentrated ammonia (0.8 g) and cold water (200 ml). The resultant reaction mixture was stirred at 0° to 10° C. for 30 minutes while keeping the pH above 8.5 by the addition of 2M NaOH. The mixture was allowed to warm up to room temperature over and stirred at pH 8.5 overnight. The mixture was then heated to 60° to 70° C., the pH was adjusted to 12 with 2M NaOH and stirred for 4 hours 30 minutes. The mixture was filtered and sodium chloride was added to the filtrate to give a 20% salt solution, the pH was then adjusted to less than pH 1 with concentrated HCl. The solid which precipitated was filtered, washed with an acidified (i.e. less than pH 1) 20% solution of sodium chloride (200 ml) and pulled dry with a vacuum pump. The resultant damp paste was dissolved in deionised water at pH 8 and dialysed to low conductivity. The product was then filtered and dried at 70° C.

EXAMPLE 2

Preparation of the Following Dye Substituted only in the β-position wherein x is 1.5, and (y+z) is 3.4:

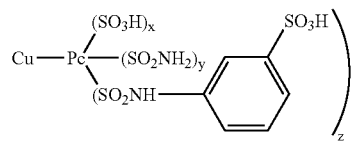

Stage 1 and 2 were Carried Out as in Example 1.

Stage 3 Preparation of the Title Product

The damp paste prepared in stage 2 (47 g) was slurried in 200 ml of cold (5° C.) water. A solution of metanilic acid (8.65 g) and concentrated ammonia (S.G. 0.88, 0.34 ml) in 100 ml of water at pH 6.5 to 7 was added to this suspension of and stirred for 2 hours keeping the temperature below 10° C. and maintaining the pH around 7 with 2M NaOH solution. The mixture was then allowed to warm up to room temperature and stirred at pH 7.8 overnight. The next day the reaction mixture was warmed to 40° C. and stirred at pH 7–8 for 2 hours. At the end of this time the reaction mixture was filtered and sodium chloride was added to the filtrate to give a 25% salt solution. The temperature was raised to 50° to 60° C. and stirred and then the pH was adjusted to less than 1 with concentrated HCl, a further 5% sodium chloride was added and the precipitate which formed was collected by filtration pulled dry with a vacuum pump. This precipitate was dissolved in deionised water at pH 7 and dialysed to low conductivity. The product was then filtered and dried at 50°–60° C.

EXAMPLES 3 to 23

Examples 3 to 23 were prepared using an analogous process to that described in Example 1 except that in stage 3 the amino compounds shown in Table 1 were used in place of metanilic acid and the molar equivalent of the amino compound and ammonia were adjusted as shown in Table 1. Table 1 also shows the ratio of the substituents represented by x, y and z.

TABLE 1

| Example | Amine R | Mol. Eq. Amine | Mol. Eq. Ammonia | Product x | y | z |
|---|---|---|---|---|---|---|
| Example 3 | morpholine (NH) | 3.3 | 0.5 | 0.5 | 2av | 2av |
| Example 4 | morpholine (NH) | 2.2 | 1.1 | 0.4 | 1.9av | 1.9av |
| Example 5 | morpholinopropylamine | 4 | 0.8 | 0 | 2.2av | 2.2av |
| Example 6 | morpholinopropylamine | 2.2 | 1.1 | 0.9 | 1.7av | 1.7av |
| Example 7 | $H_2NCH_2CH_2SO_3H$ | 3.3 | 0.5 | 0.7 | 0.4 | 2.7 |
| Example 8 | $H_2NCH_2CH_2SO_3H$ | 2.2 | 1.1 | 0.5 | 0.9 | 2 |
| Example 9 | $H_2NCH_2CH_2CO_2H$ | 3.3 | 0.5 | 2.4 | 0.7 | 1.5 |
| Example 10 | $H_2NCH_2CH_2CO_2H$ | 2.2 | 1.1 | 2.3 | 1.1 | 0.9 |
| Example 11 | $HN(CH_3)CH_2CH_2SO_3H$ | 2.2 | 1.1 | 1.3 | 0.9 | 1.8 |
| Example 12 | $HN(CH_3)CH_2CH_2SO_3H$ | 3.3 | 0.5 | 1.4 | 0.7 | 2.4 |
| Example 13 | $H_2NCH_2PO_3H_2$ | 2.2 | 1.1 | 1.2 | 0.3 | 2.7 |
| Example 14 | $NH(CH_2CH_2SO_3H)(CH_2CH_2CONH_2)$ | 3.3 | 0.5 | 1.4 | 0.8 | 1.5 |
| Example 15 | $NH(CH_2CH_2SO_3H)(CH_2CH_2CONH_2)$ | 2.2 | 1.1 | 1.2 | 1.0 | 1.3 |

TABLE 1-continued
| Example | Amine R | Mol. Eq. Amine | Mol. Eq. Ammonia | Product x | y | z |
|---|---|---|---|---|---|---|
| Example 16 | 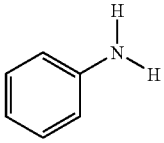 | 3 | 0.5 | 0.1 | 2av | 2av |
| Example 17 | 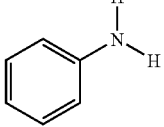 | 2 | 1 | 0.5 | 1.8av | 1.8av |
| Example 18 | 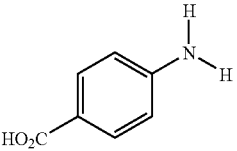 | 2 | 1.1 | 1.3 | 0.7av | 0.7av |
| Example 19 | 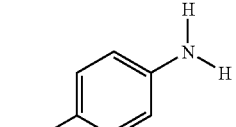 | 3 | 0.5 | 1.3 | 0.7av | 0.7av |
| Example 20 | 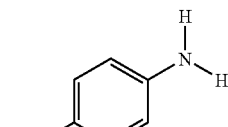 | 2 | 1.1 | 1 | 1.5av | 1.5av |
| Example 21 | 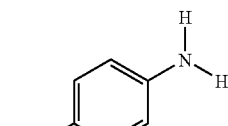 | 3 | 0.55 | 0.4 | 1.9av | 1.9av |
| Example 22 | 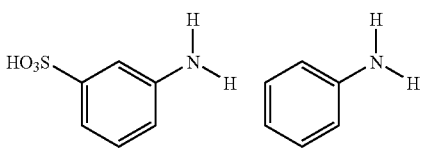 | 1 + 1 | 1 | 0.6 | 1.4av | 1.2av |
| Example 23 | 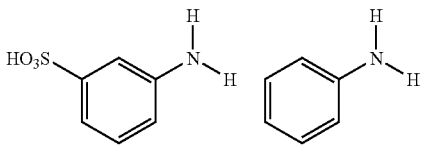 | 1.5 + 0.5 | 0.5 | 0.5 | 0.8av | 1.8av |

EXAMPLES 24 and 25

Examples 24 and 25 were prepared using an analogous process to that described in Example 1 except that in stage 3 the amino compounds shown in Table 2 were used in place of metanilic acid and methylamine was used in place of ammonia. Table 2 also shows the ratio of the substituents represented by x, y and z.

TABLE 2

| Example | Amine | Equivalents of Amine | Equivalents of Methylamine | x | y | z |
|---|---|---|---|---|---|---|
| Example 24 | $H_2NCH_2CH_2SO_3H$ | 3 | 0.5 | 0.2 | 0.6 | 2.9 |
| Example 25 | $H_2NCH_2CH_2SO_3H$ | 2 | 1 | ND | ND | ND |

EXAMPLE 26

Example 26 was prepared using an analogous process to that described in Example 1 except that in stage 3 the amino compounds shown in Table 3 were used in place of metanilic acid and dimethylamine was used in place of ammonia. Table 3 also shows the ratio of the substituents represented by x, y and z.

TABLE 3

| Example | Amine | Equivalents of Amine | Equivalents of Dimethylamine | x | y | z |
|---|---|---|---|---|---|---|
| Example 26 | $H_2NCH_2CH_2SO_3H$ | 3 | 0.5 | ND | ND | ND |

In Tables 2 and 3, ND means not determined.

Comparative Dye 1

Comparative Dye 1 was C.I. Direct Blue 199 obtained as Proje™ Cyan 1 from Avecia Ltd, as supplied this is a compound of Formula:

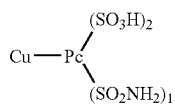

C.I. Direct Blue 199 is the most widely used cyan ink-jet dye and is made by sulfonation and amination of phthalocyanine pigment and comprises dye substituted in both the α and β positions.

Comparative Dye 2

Comparative Dye 2 was prepared, as in Example 1 of International Patent Application WO99/67334, by sulfonation of copper phthalocyanine pigment followed by amination/amidation, a process which resulted in a complex dye mixture of general formula:

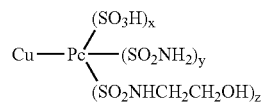

wherein the substituents are in both the α and β positions and where x is 2.7, y is 0.5 and z is 0.8.

EXAMPLE 27

Preparation of Inks 1 and 2 and the Comparative Inks

The dyes of Example 1 and 2 and the dyes of Comparative Example 1 and Comparative Example 2 were converted into inks by dissolving 3 g of dye in 100 ml of a liquid medium comprising:

| | |
|---|---|
| Thiodiglycol | 5% |
| 2-Pyrollidone | 5% |
| Surfynol ™ 465 | 1% |
| Water | 89% |
| | (all % by weight) | and adjusting the pH of the ink to pH 8 with sodium hydroxide. An ink of this composition would be expected to have a viscosity of between 1 to 3 cp. Surfynol™ 465 is a surfactant from Air Products Ltd.

Ink-Jet Printing

The inks and the comparative inks were filtered through a 0.45 micron nylon filters and then incorporated into empty print cartridges using a syringe.

The inks were then ink-jet printed onto Epson Premium Glossy Photopaper ("SEC PM") and Canon PR101 Photopaper ("PR101").

The prints, at 100%, were tested for ozone fastness by exposure to 1 ppm ozone at 40° C., 50% relative humidity for 24 hrs in a Hampden 903 Ozone cabinet. Fastness of the printed ink to ozone was judged by the difference in the optical density before and after exposure to ozone.

Light-fastness of the printed image was assessed by fading the printed image in an Atlas Ci5000 Weatherometer for 100 hours and then measuring the change in the optical density.

Optical density measurements were performed using a Gretag spectrolino spectrophotometer set to the following parameters:

| Measuring Geometry | 0°/45° |
|---|---|
| Spectral Range | 400–700 nm |
| Spectral Interval | 20 nm |
| Illuminant | D65 |
| Observer | 2° (CIE 1931) |
| Density | Ansi A |
| External Filler | None |

Light and Ozone fastness are assessed by the percentage change in the optical density of the print, where a lower figure indicates higher fastness, and the degree of fade. The degree of fade is expressed as $\Delta E$ where a lower figure indicates higher light fastness. $\Delta E$ is defined as the overall change in the CIE colour co-ordinates L, a, b of the print and is expressed by the equation $\Delta E=(\Delta L^2+\Delta a^2+\Delta b^2)^{0.5}$. Results for light and ozone fastness are shown below.

| Light Fastness | | | | |
|---|---|---|---|---|
| | Delta E PR101 | % OD Loss PR101 | Delta E SEC PM | % OD Loss SEC PM |
| Ink 1 | 7 | 5 | 2 | 3 |
| Ink 2 | 17 | 21 | 6 | 12 |
| Comparative Ink 1 | 21 | 30 | 4 | 9 |
| Comparative Ink 2 | 20 | 29 | 5 | 13 |

| Ozone Fastness | | | | |
|---|---|---|---|---|
| | Delta E PR101 | % OD Loss PR101 | Delta E SEC PM | % OD Loss SEC PM |
| Ink 1 | 5 | 5 | 4 | 5 |
| Ink 2 | 13 | 21 | 5 | 15 |
| Comparative Ink 1 | 51 | 51 | 19 | 28 |
| Comparative Ink 2 | 51 | 58 | 23 | 41 |

Clearly dyes according to the present invention display an enhanced ozone fastness and an equivalent or superior light fastness compared to dyes substituted in both the α and β positions.

Further Inks

The inks described in Tables A and B may be prepared using the dyes made in Examples 1 and 2. Numbers quoted in the second column onwards refer to the number of parts of the relevant ingredient and all parts are by weight. The inks may be applied to paper by thermal or piezo ink-jet printing.

The following abbreviations are used in Table A and B:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 1 | 10.0 | 85 | 3 | | 3 | 3 | | | | 5 | 1 | |
| 2 | 2.1 | 91 | | 8 | | | | | | | | 1 |
| 1 | 3.1 | 86 | 5 | | | | | 0.2 | 4 | | | 5 |
| 2 | 1.1 | 81 | | | 9 | | 0.5 | 0.5 | | | 9 | |
| 1 | 2.5 | 60 | 4 | 15 | 3 | 3 | | | 6 | 10 | 5 | 4 |
| 2 | 5 | 65 | | 20 | | | | | | 10 | | |
| 1 | 2.4 | 75 | 5 | 4 | | 5 | | | | 6 | | 5 |
| 2 | 4.1 | 80 | 3 | 5 | 2 | 10 | | 0.3 | | | | |
| 1 | 3.2 | 65 | | 5 | 4 | 6 | | | 5 | 4 | 6 | 5 |
| 2 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 1 | 1.8 | 80 | | 5 | | | | | | | 15 | |
| 2 | 2.6 | 84 | | | 11 | | | | | 5 | | |
| 1 | 3.3 | 80 | 2 | | 10 | | | | | 2 | | 6 |
| 2 | 12.0 | 90 | | | 7 | | 0.3 | 3 | | | | |
| 1 | 5.4 | 69 | 2 | 20 | 2 | 1 | | | | | 3 | 3 |
| 2 | 6.0 | 91 | | 4 | | | | | | 5 | | |

TABLE B

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 |  |  | 0.2 |  |  |  |  | 5 |  |
| 2 | 9.0 | 90 |  | 5 |  |  |  |  |  | 1.2 |  | 5 |
| 1 | 1.5 | 85 | 5 | 5 |  | 0.15 | 5.0 | 0.2 |  |  |  |  |
| 2 | 2.5 | 90 |  | 6 | 4 |  |  |  |  | 0.12 |  |  |
| 1 | 3.1 | 82 | 4 | 8 |  | 0.3 |  |  |  |  |  | 6 |
| 2 | 0.9 | 85 |  | 10 |  |  |  |  | 5 | 0.2 |  |  |
| 1 | 8.0 | 90 |  | 5 | 5 |  |  | 0.3 |  |  |  |  |
| 2 | 4.0 | 70 |  | 10 | 4 |  |  |  | 1 |  | 4 | 11 |
| 1 | 2.2 | 75 | 4 | 10 | 3 |  |  |  | 2 |  | 6 |  |
| 2 | 10.0 | 91 |  |  | 6 |  |  |  |  |  | 3 |  |
| 1 | 9.0 | 76 |  | 9 | 7 |  | 3.0 |  |  | 0.95 | 5 |  |
| 2 | 5.0 | 78 | 5 | 11 |  |  |  |  |  |  | 6 |  |
| 1 | 5.4 | 86 |  |  | 7 |  |  |  |  |  | 7 |  |
| 2 | 2.1 | 70 | 5 | 5 | 5 | 0.1 | 0.2 | 0.1 | 5 | 0.1 | 5 |  |
| 1 | 2.0 | 90 |  | 10 |  |  |  |  |  |  |  |  |
| 2 | 2 | 88 |  |  |  |  |  | 10 |  |  |  |  |
| 1 | 5 | 78 |  |  | 5 |  |  | 12 |  |  | 5 |  |
| 2 | 8 | 70 | 2 |  | 8 |  |  | 15 |  |  | 5 |  |
| 1 | 10 | 80 |  |  |  |  |  | 8 |  |  | 12 |  |
| 2 | 10 | 80 |  | 10 |  |  |  |  |  |  |  |  |

The invention claimed is:

1. A composition comprising:
(a) a major dye component which is a mixture of phthalocyanine dyes of Formula (1) and salts thereof:

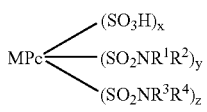

Formula (1)

wherein:
M is Cu or Ni;
Pc represents a phthalocyanine nucleus of formula;

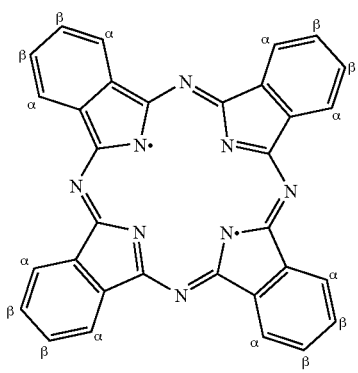

$R^1$ and $R^2$ independently are H or methyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted aliphatic or aromatic ring system;
x is 0.1 to 3.8;
y is 0.1 to 3.8;
z is 0.1 to 3.8;
the sum of (x+y+z) is 4; and
the substituents, represented by x, y and z, are attached only to a β-position on the phthalocyanine ring; and
(b) a liquid medium which comprises water and an organic solvent or an organic solvent free from water.

2. A composition according to claim 1 comprising:
(a) a major dye component which is a mixture of phthalocyanine dyes of Formula (1) and salts thereof:

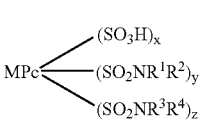

Formula (1)

wherein:
M is Cu or Ni;
Pc represents a phthalocyanine nucleus of formula;

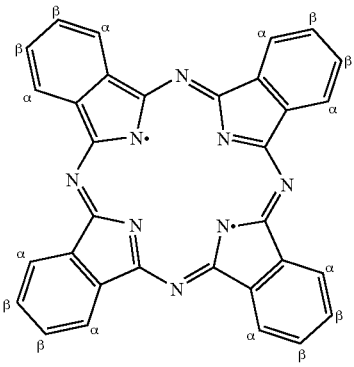

$R^1$ and $R^2$ independently are H or methyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted aliphatic or aromatic ring system;

x is 0.1 to 3.8;
y is 0.1 to 3.8;
z is 0.1 to 3.8;
the sum of (x+y+z) is 4; and
the substituents, represented by x, y and z, are attached only to a β-position on the phthalocyanine ring and the mixture of phthalocyanine dyes of Formula (1) are obtainable by a process which comprises cyclisation of appropriate β⁻-sulfo substituted phthalic acid, phthalonitrile, iminoisoindoline, phthalic anhydride, phthalimide or phthalamide optionally in the presence of a suitable nitrogen source, a copper or nickel salt and a base followed by chlorination and then amination/amidation; and
(b) a liquid medium which comprises water and an organic solvent or an organic solvent free from water.

3. A composition according to either claim 1 or claim 2 comprising:
(a) a major dye component which is a mixture of phthalocyanine dyes of Formula (1) and salts thereof:

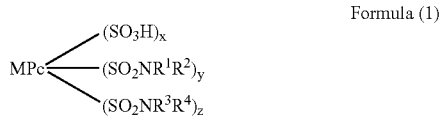

Formula (1)

wherein:
M is Cu or Ni;
Pc represents a phthalocyanine nucleus of formula;

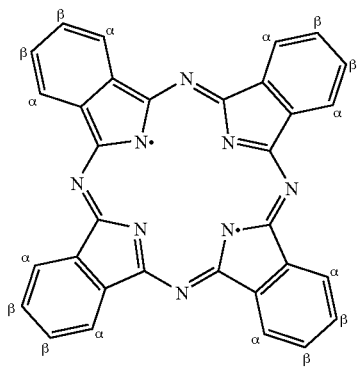

$R^1$ and $R^2$ independently are H or methyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted aliphatic or aromatic ring system;
x is 0.1 to 3.8;
y is 0.1 to 3.8;
z is 0.1 to 3.8;
the sum of (x+y+z) is 4; and
the substituents, represented by x, y and z, are attached only to a β-position on the phthalocyanine ring and the mixture of phthalocyanine dyes of Formula (1) are obtainable by cyclisation of 4-sulfo-phthalic acid in the presence of a nitrogen source, a copper or nickel salt and a base to give phthalocyanine β-tetrasulfonic acid which is then chlorinated and the sulfonyl chloride groups so formed are reacted with compounds of formula $HNR^1R^2$ and $HNR^3R^4$ wherein $R^1$, $R^2$, $R^3$ and $R^4$ are as hereinbefore defined; and
(b) a liquid medium which comprises water and an organic solvent or an organic solvent free from water.

4. A composition according to claim 1 comprising:
(a) a mixture of phthalocyanine dyes of Formula (1) and salts thereof:

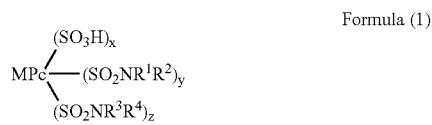

Formula (1)

wherein:
M is Cu or Ni;
Pc represents a phthalocyanine nucleus;
$R^1$ and $R^2$ independently are H or methyl;
$R^3$ is H or methyl;
$R^4$ is optionally substituted hydrocarbyl; or
$R^3$ and $R^4$ together with the nitrogen atom to which they are attached represent an optionally substituted aliphatic or aromatic ring system;
x is 0.1 to 3.8;
y is 0.1 to 3.8;
z is 0.1 to 3.8;
the sum of (x+y+z) is 4; and the substituents, represented by x, y and z, are attached only to a β-position on the phthalocyanine ring and the mixture of phthalocyanine dyes of Formula (1) are obtainable by a process which comprises cyclisation of appropriate β substituted phthalic acid, phthalonitrile, iminoisoindoline, phthalic anhydride, phthalimide or phthalamide in the presence of a suitable copper or nickel salt followed by chlorination and then amination/amidation; and
(b) a medium which comprises water and an organic solvent or an organic solvent free from water.

5. A composition according to claim 1 or claim 2 wherein M is Cu.

6. A composition according to claim 1 or claim 2 wherein x has a value of 0.5 to 3.5, y has a value of 0.5 to 3.5 and z has a value of 0.5 to 3.5.

7. A composition according to claim 1 or claim 2 wherein $R^1$, $R^2$ and $R^3$ are independently H or methyl and $R^4$ is optionally substituted aryl.

8. A composition according to claim 1 or claim 2 wherein $R^4$ is phenyl bearing at least one sulfo, carboxy or phosphato substituent and having further optional substituents.

9. A composition according to claim 1 or claim 2 wherein $R^4$ is phenyl bearing a single sulfo substituent.

10. A composition according to claim 1 or claim 2 wherein $R^1$ and $R^2$ independently are H or methyl and $R^3$ and $R^4$ together with the nitrogen atom to which they are attached represent an optionally substituted 3 to 8 membered aliphatic or aromatic ring.

11. A composition according to claim 1 or claim 2 wherein $R^1$ and $R^2$ independently are H or methyl, $R^3$ is H or optionally substituted $C_{1-8}$alkyl and $R^4$ is optionally substituted $C_{1-8}$alkyl.

12. A composition according to claim 11 wherein $R^1$ and $R^2$ are H, $R^3$ is H or $C_{1-4}$alkyl bearing at least one acid substituent selected from the group consisting of —SO$_3$H, —COOH or —PO$_3$H$_2$ and $R^4$ is $C_{1-4}$alkyl bearing at least one acid substituent selected from the group consisting of —SO$_3$H, —COOH or —PO$_3$H$_2$.

13. A composition according to claim 1 or claim 2 wherein $R^1$ and $R^2$ are H.

14. A composition according to claim 11 wherein $R^1$, $R^2$ and $R^3$ are H, and $R^4$ is —CH$_2$CH$_2$SO$_3$H.

15. A composition according to claim 11 wherein $R^1$ is H, $R^2$ is CH$_3$, $R^3$ is H and $R^4$ is —CH$_2$CH$_2$SO$_3$H.

16. A composition according to claim 11 wherein $R^1$ and $R^2$ are CH$_3$, $R^3$ is H and $R^4$ is —CH$_2$CH$_2$SO$_3$H.

17. A composition according to claim 1 or claim 2 wherein at least 70% by weight of the total amount of phthalocyanine dye is of Formula (1).

18. A composition according to claim 17 wherein at least 90% by weight of the total amount of phthalocyanine dye is of Formula (1).

19. A composition according to claim 1 or claim 2 wherein the dyes of Formula(1) are free from fibre reactive groups.

20. A composition according to claim 1 or claim 2 which comprises:
    (a) from 0.1 to 20 parts of compounds of Formula (1); and
    (b) from 80 to 99.9 parts of a liquid medium;
wherein all parts are by weight and the number of parts of (a)+(b)=100.

21. A composition according to claim 20 which comprises:
    (a) from 0.5 to 15 parts of compounds of Formula (1); and
    (b) from 85 to 99.5 parts of a liquid medium;
wherein all parts are by weight and the number of parts of (a)+(b)=100.

22. A composition according to claim 20 which comprises:
    (a) from 1 to 5 parts of compounds of Formula (1); and
    (b) from 95 to 99 parts of a liquid medium;
wherein all parts are by weight and the number of parts of (a)+(b)=100.

23. A composition according to claim 1 or claim 2 wherein the liquid media may contain additional components conventionally used in ink-jet printing inks.

24. A composition according to claim 1 or claim 2 which is an ink suitable for use in an ink-jet printer.

25. A mixture of dyes of Formula (4) and salts thereof:

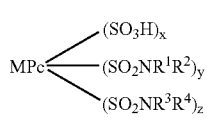

Formula (4)

wherein:
M is Cu or Ni;
Pc represents a phthalocyanine nucleus of formula;

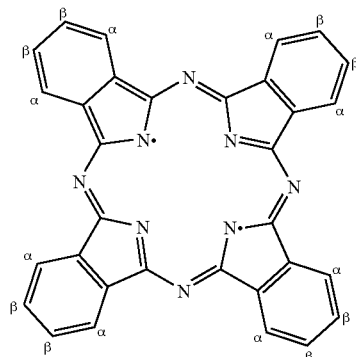

$R^1$ and $R^2$ independently are H or methyl;
$R^3$ is H or optionally substituted $C_{1-8}$alkyl;
$R^4$ is optionally substituted $C_{1-8}$alkyl or phenyl bearing at least one sulfo, carboxy or phosphate substituent and having further optional substituents other than amino or substituted amino; or
$R^3$ and $R^4$ together with the nitrogen atom to which they are attached represent an optionally substituted 5- or 6-membered aliphatic or aromatic ring;
x is 0.1 to 3.8;
y is 0.1 to 3.8;
z is 0.1 to 3.8;
the sum of (x+y+z) is 4; and the substituents, represented by x, y and z, are attached only to a β-position on the phthalocyanine ring and provided that the mixture of dyes is free from fiber reactive groups.

26. A mixture of dyes according to claim 25 of Formula (4) and salts thereof:

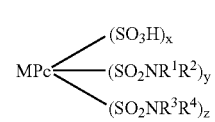

Formula (4)

wherein:
M is Cu or Ni;
Pc represents a phthalocyanine nucleus of formula;

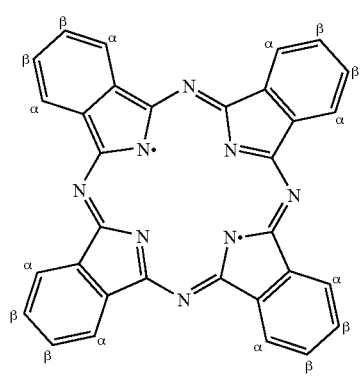

$R^1$ and $R^2$ independently are H or methyl;
$R^3$ is H or optionally substituted $C_{1-8}$-alkyl;

R⁴ is optionally substituted $C_{1-8}$alkyl or phenyl bearing at least one sulfo, carboxy or phosphato substituent and having further optional substituents other than amino or substituted amino; or R³ and R⁴ together with the nitrogen atom to which they are attached represent an optionally substituted 5- or 6-membered aliphatic or aromatic ring:

x is 0.1 to 3.8;
y is 0.1 to 3.8;
z is 0.1 to 3.8;

the sum of (x+y+z) is 4; and the substituents, represented by x, y and z, are attached only to a (β-position on the phthalocyanine ring and the mixture of phthalocyanine dyes of Formula (1) are prepared by a process which comprises cyclisation of appropriate β-sulfo substituted phthalic acid, phthalonitrile, iminoisoindoline, phthalic anhydride, phthalimide or phthalamide optionally in the presence of a suitable nitrogen source, a copper or nickel salt and a base followed by chlorination and then amination/amidation and provided that the mixture of dyes is free from fiber reactive groups.

27. A mixture of dyes according to either claim 25 or claim 26 of Formula (2) and salts thereof:

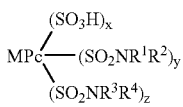

Formula (2)

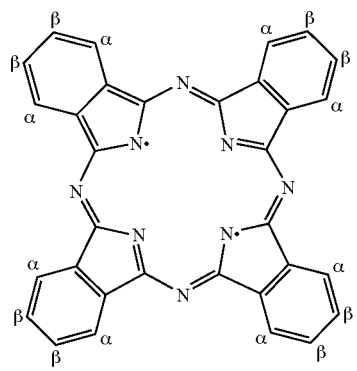

R¹, R² and R³ independently are H or methyl;
R⁴ is phenyl bearing at least one sulfo, carboxy or phosphato substituent and having further optional substituents other than amino or substituted amino;
x is 0.5 to 3.5;
y is 0.5 to 3.5;
z is 0.5 to 3.5;
the sum of (x+y+z) is 4; and the substituents, represented by x, y and z, are attached only to a β-position on the phthalocyanine ring and the mixture of phthalocyanine dyes of Formula (1) are prepared by a process which comprises cyclisation of appropriate β⁻-sulfo substituted phthalic acid, phthalonitrile, iminoisoindoline, phthalic anhydride, phthalimide or phthalamide optionally in the presence of a suitable nitrogen source, a copper or nickel salt and a base followed by chlorination and then amination/amidation and provided that the mixture of dyes is free from fiber reactive groups.

28. A mixture of dyes according to either claim 25 or claim 26 of Formula (3) and salts thereof:

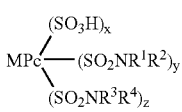

Formula (3)

wherein:
M is Cu;
Pc represents a phthalocyanine nucleus of formula;

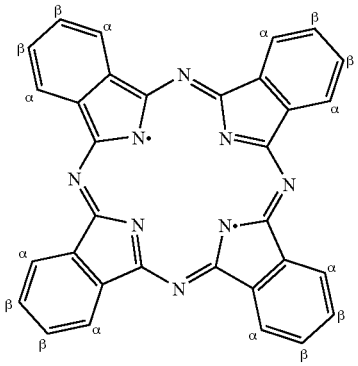

R¹ and R² independently are H or methyl;
R³ and R⁴ independently are $C_{1-4}$alkyl bearing at least one acid substituent, selected from the group consisting of —SO₃H, —COOH or —PO₃H₂;
x is 0.5 to 3.5;
y is 0.5 to 3.5;
z is 0.5 to 3.5;
the sum of (x+y+z) is 4; and the substituents, represented by x, y and z, are attached only to a β-position on the phthalocyanine ring and the mixture of phthalocyanine dyes of Formula (1) are prepared by a process which comprises cyclisation of appropriate β⁻-sulfo substituted phthalic acid, phthalonitrile, iminoisoindoline, phthalic anhydride, phthalimide or phthalamide optionally in the presence of a suitable nitrogen source, a copper or nickel salt and a base followed by chlorination and then amination/amidation.

29. A mixture of dyes according to claim 25 or claim 26 wherein R¹ and R² are H.

30. A mixture of dyes according to either claim 25 or claim 26 wherein R¹, R² and R³ are H and R⁴ is —CH₂CH₂SO₃H.

31. A mixture of dyes according to either claim 25 or claim 26 wherein R¹ is H, R² is CH₃, R³ is H and R⁴ is —CH₂CH₂SO₃H.

32. A mixture of dyes according to either claim 25 or claim 26 wherein R¹ and R² are CH₃, R³ is H and R⁴ is —CH₂CH₂SO₃H.

33. A mixture of dyes according to either claim 25 or claim 26 wherein R¹ and R² independently are H or methyl and R³ and R⁴ together with the nitrogen atom to which they are attached represent an optionally substituted 5- or 6-membered aliphatic or aromatic ring.

34. A composition which comprises a major dye component which is a mixture of phthalocyanine dyes of Formula (4), as defined in claim 25 or claim 26, and water.

35. A composition according to claim 34 which is an ink suitable for use in an inkjet printer.

36. A process for forming an image on a substrate comprising applying a composition according to claim 24 or claim 35 thereto by means of an ink-jet printer.

37. A material printed with a composition according to claim 1.

38. A material according to claim 37 which is a photograph printed using an ink-get printer.

39. An ink-jet printer cartridge comprising a chamber and an ink wherein the ink is in the chamber and the ink is according to claim 24 or claim 35.

* * * * *